United States Patent [19]

Miyatani et al.

[11] Patent Number: 4,678,292
[45] Date of Patent: Jul. 7, 1987

[54] CURVED STRUCTURE AND METHOD FOR MAKING SAME

[75] Inventors: Kazuo Miyatani; Isao Sato, both of Tokyo, Japan

[73] Assignee: RCA Corporation, Princeton, N.J.

[21] Appl. No.: 625,025

[22] Filed: Jun. 27, 1984

Related U.S. Application Data

[63] Continuation-in-part of Ser. No. 259,515, May 1, 1981, abandoned.

[51] Int. Cl.⁴ .............................. G02B 5/10; F24J 2/46
[52] U.S. Cl. ..................................... 350/609; 126/418; 350/628
[58] Field of Search ....................... 350/295, 296, 310; 126/418, 438, 426, 440, 451

[56] References Cited

U.S. PATENT DOCUMENTS

| | | |
|---|---|---|
| 2,123,049 | 7/1938 | Irsy . |
| 3,607,584 | 9/1971 | Becht ............................. 350/296 X |
| 3,654,471 | 4/1972 | Nilsson . |
| 3,966,308 | 6/1976 | Nilson . |
| 4,038,971 | 4/1977 | Bezborodko ...................... 350/320 |
| 4,105,429 | 8/1978 | Delgado ............................... 65/287 |
| 4,119,428 | 10/1978 | DeAngelis et al. ................. 65/287 |
| 4,135,493 | 1/1979 | Kennedy ...................... 350/296 X |
| 4,139,270 | 2/1979 | Dotson .............................. 350/296 |
| 4,161,942 | 7/1979 | Monk ........................... 350/310 X |
| 4,173,397 | 11/1979 | Simpson ...................... 350/296 X |
| 4,229,077 | 8/1980 | Schwab ....................... 350/310 X |
| 4,240,406 | 12/1980 | Hutchison .......................... 126/438 |
| 4,243,301 | 1/1981 | Powell .............................. 350/296 |
| 4,299,446 | 11/1981 | Jenkins ............................. 350/296 |
| 4,337,997 | 7/1982 | Sadoune et al. ............... 350/296 X |
| 4,423,719 | 1/1984 | Hutchison .......................... 126/438 |

FOREIGN PATENT DOCUMENTS

| | | |
|---|---|---|
| 2738859 | 3/1979 | Fed. Rep. of Germany ...... 350/296 |
| 2738597 | 3/1979 | Fed. Rep. of Germany ...... 350/296 |

OTHER PUBLICATIONS

Timoshenko, *Strength of Materials*, Part I, "Elementary Theory Problems", D. Vanostrand Company Inc., New York, (1930), pp. 92 & 93.

Primary Examiner—John K. Corbin
Assistant Examiner—David Lewis
Attorney, Agent, or Firm—Joseph S. Tripoli; William Squire

[57] ABSTRACT

A plurality of thin flexible sheet ribs are secured to thin flexible sheet stringer members to form a distortable frame structure. One edge of the ribs lie in a curved surface such as a parabolic cylindrical surface. A thin sheet of boron-silicate glass, preferably formed with a second surface mirror, is annealed and then bent at room temperature to abut the edges of the ribs lying in the curved surface and is retained in place by ribs at opposite edges of the sheet. The inherent strength of the glass under stress, when bent, provides structural rigidity to the combined elements.

19 Claims, 7 Drawing Figures

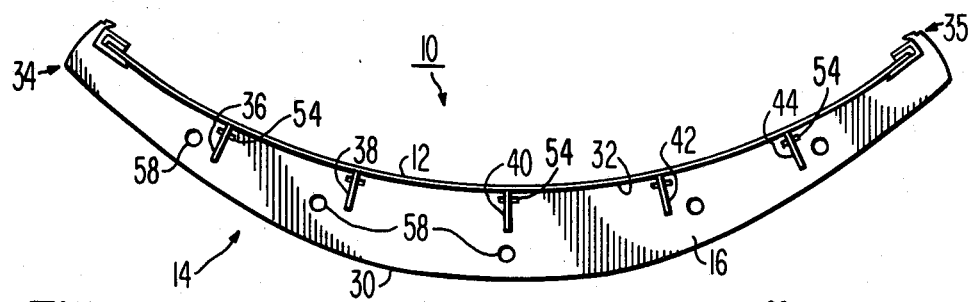
Fig. 3
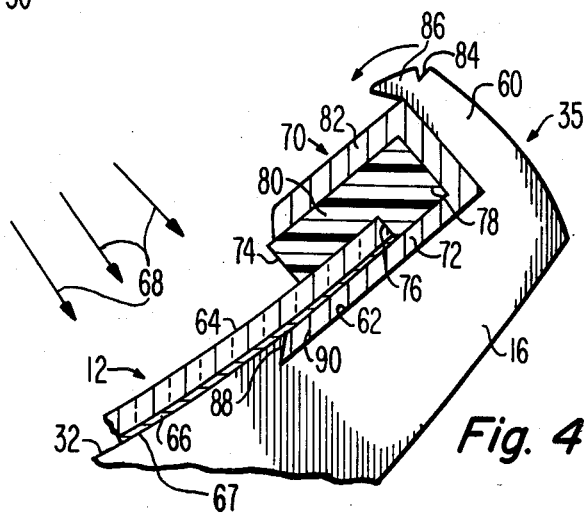
Fig. 4
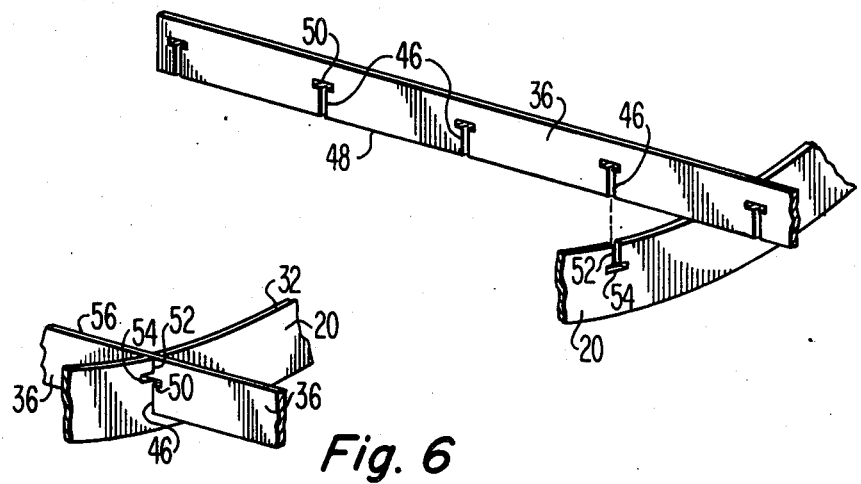
Fig. 5
Fig. 6

CURVED STRUCTURE AND METHOD FOR MAKING SAME

This is a continuation-in-part division of application Ser. No. 259,515, filed May 1, 1981 now abandoned.

The present invention relates to curved structures and methods for making them and, more particularly, to structures including cylindrical mirrors useful for concentrating or projecting light energy.

Of interest is co-pending application Ser. No. 259,517 (RCA 75,715) entitled "Lamp" by K. Miyatani and I. Sato, the same inventors of the present invention and filed on the same date as the present application.

Curved structures as described herein are particularly useful in solar collecting systems or lighting fixtures. Regardless of the particular implementation, it is important to utilize the reflector efficiently. The implementations which presently have the most significance in the context of saving energy are solar and lighting systems, although other systems employing reflecting curved structures are also contemplated.

Radiation concentrators may employ spherical or cylindrical lenses, and/or mirrors or combinations thereof. Spherical concentrators are useful for high concentration ratio (CR) systems ($50 < CR < 300$), and in solar collecting systems, require a two-axis solar tracking drive system. Parabolic cylindrical concentrators are useful with lower concentration ratio systems ($2 < CR < 50$) and require, in some instances, a single axis tracking system. Considering costs, cylindrical concentrator systems are superior to spheric systems, if a relatively inexpensive solar radiation concentrator and a high efficiency energy converter are available.

Typical prior art parabolic mirrors employ casted epoxy, aluminum alloy, or metallized plastic bases. Pressed steel or other metal bases are also employed. The surfaces of those mirror bases are mechanically or chemically finished mirror smooth. In any case, processing of non-spheric large-scale parabolic mirrors is very difficult. Particularly, the mirror finishing technique for both metal and epoxy bases requires skilled artisans. A rough surface mirror scatters light and an irregular curvature which departs from a parabolic curve defocuses the light or radiant energy, thus impairing the optical performance. To provide a true parabolic reflector, macroscopic curvature must be exactly satisfied and microscopically very smooth surfaces must be established.

The reflecting surface of prior art parabolic mirrors is usually formed of polished metal or metallized plastic and experience has shown it is difficult for such surfaces to establish and maintain their reflecting efficiency. More particularly, the reflector may induce light scattering resulting in lower collection efficiency. This efficiency deteriorates when the surface is cleaned, a result of the relatively ease with which the surface may be damaged. This requires additional structure to house the reflector which also induces absorption loss and reduces the efficiency of the system. Where the reflecting surface is formed of a metallized plastic, the art suggests that the surface changes its shape under the influence of heat and the surface has a tendency to buckle when the collector is in use. Another disadvantage arises from the fact that solar collector mirrors may be open to the ambient conditions and can be subject to the influence of weather.

Attempts have been made by the prior art to establish highly reflective mirrors and to avoid these particular problems by constructing parabolic reflectors of plane glass mirrors. For example, U.S. Pat. No. 4,038,971 suggests such a construction. However, the glass mirrors employed are strips of plain glass which are attached to a flexible backing. The disadvantage of this arrangement is that the reflecting efficiency is lower than it should be because there are spaces or lines between the strips and many glass strips have to be processed and assembled. To provide a glass mirror as a reflector which is concave is relatively costly since glass "blanks" or sheets must be bent in ovens and molded to the desired shape. As suggested in U.S. Pat. No. 4,038,971 the glass blanks must be ground, polished, and coated with a silvering material to provide a mirror effect. This patent also suggests that the silvering or metallization coating may be subject to the elements and be deteriorated thereby.

U.S. Pat. No. 4,135,493 discloses a parabolic trough solar energy collector system. However, in this system an elongated support is rigidly attached to a plurality of ribs forming a rigid parabolic trough reflecting curve reference surface for a reflecting member which is bent to conform to this surface, suggesting a metal reflector having the disadvantages noted above. The structure described requires the ribs to be accurately aligned with respect to each other along the given parabolic curve so that the reflecting medium can conform to the desired parabolic shape. Any deviations of any of the rib members from this parabolic shape, of course, would result in defocusing of the parabola which would be distorted. To align the ribs, they are mechanically fastened in a relatively rigid system to a central support member.

To concentrate solar radiation, Fresnel lenses may also be used. However, these lenses have large aberrations and are subject to thermal expansion, both of which lower collection efficiency. Short focal length lenses have very sharp Fresnel edges which reduce the effective collection surface area and which prohibit processing these lenses at relatively low costs.

In accordance with one aspect of the present invention, a method of forming a curved glass sheet structure comprises bending a sheet of resilient glass into a curved state at room temperature, and restraining the sheet in the curved state. The means restraining the glass comprises a ribbed frame which forms with the glass a monocoque structure. One particularly useful shape into which the resilient glass may be bent is that of a parabolic mirror which finds application as a relatively low cost solar collector or illuminating reflector.

In accordance with a second aspect of the present invention, a curved reflector structure comprises a distortable frame structure and a stress inducing and stress absorbing skin member secured to the frame structure which together form a curved monocoque unit in which the skin member is a sheet of highly reflective material.

In the drawing:

FIG. 3 is an end elevation view of the structure of FIG. 1;

FIG. 4 is a detailed elevation view of a portion of the structure of FIG. 1 illustrating the connection of the sheet member to the frame structure;

FIG. 5 is an exploded view of a rib and stringer member forming part of the structure of FIG. 1;

FIG. 6 shows the rib and stringer member of FIG. 5 interconnected; and

Figure 1:
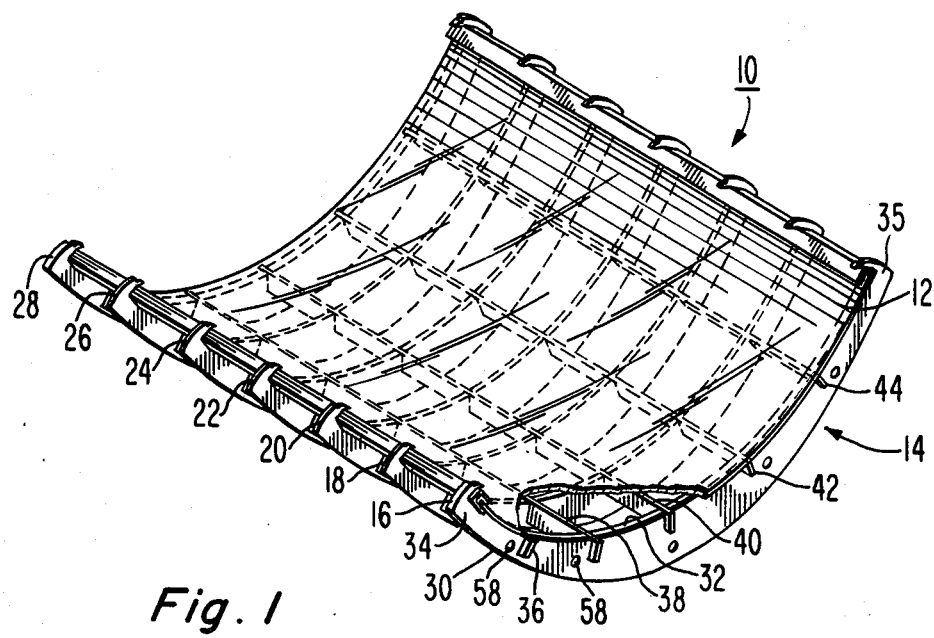
FIG. 1 is an isometric view of a monocoque structure in accordance with one embodiment of the present invention.
Figure 2:
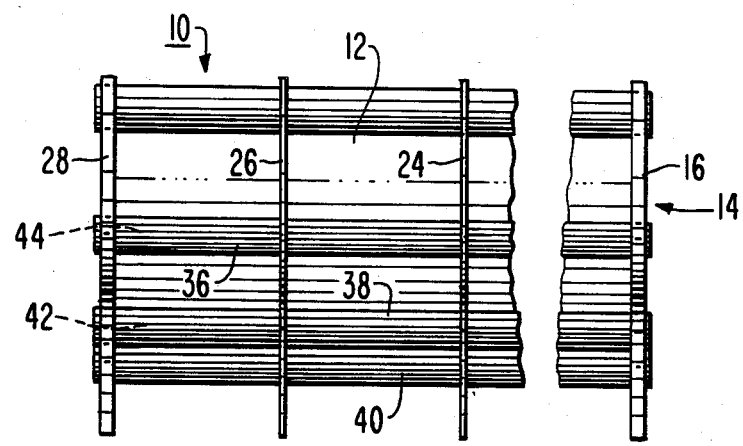
FIG. 2 is a side elevation view of the structure of FIG. 1.

In FIGS. 1, 2, and 3 reflector structure 10 comprises a reflecting sheet skin member 12 secured to a frame structure 14. The frame structure 14 is a distortable structure. This will become clearer as its structure is described.

By distortable is meant that any point on the frame structure regardless its location on the frame structure is movable with respect to any other point on the frame structure regardless the location of the other point on the frame structure. What this means is that if a force is applied to the frame structure to, by way of example, twist it, using any point as a reference point, the remainder of the structure will move in response to that force, i.e., twisting, with respect to that one point. This is not to say, however, that forces cannot be applied to this structure in some given direction in which the structure remains relatively rigid, as will be explained.

What is intended is that the frame structure is relatively flexible but not as flexible as, for example, a sheet of foam rubber. The frame structure exhibits a given looseness so that when a force is applied to the structure, the structure will move in response to that force.

The structure is sufficiently flexible in a direction about the trough axis so that its elements conform to the shape of the sheet member 12 which is attached to the structure under stress. The structure has a surface, which is deformable, and which defines that desired shape in at least one orientation of the frame elements. The sheet member which is bent under stress when attached to the frame structure causes the frame structure to distort and conform to the desired shape, such as a cylindrical parabola by way of example, when stressed by the bent sheet member. This implies, at the least, and, in fact, it is required, that the sheet member is under stress when bent and attached to the frame structure to thereby form the cylindrical surface. Further, the sheet member should be sufficiently stiff (resistance to buckling or folding under compressive stresses) so that any further distortion of the frame structure will be resisted by the internal stresses of the sheet member induced by that further distortion. Thus the sheet member further stiffens the combined structure while at the same time the frame structure absorbs the stresses of the bent sheet member. In this sense, the sheet member and frame structure together form a monocoque unit where the strength of the structure is significantly concentrated in the bent sheet member and wherein the significance of the frame structure is to provide the given desired curve shape to the bent sheet member and retain the sheet member in the stressed bent state. All of this will become clearer as the elements of the frame structure and the sheet member are described in more detail below.

The frame structure has sufficient rigidity in some directions and flexibility in other directions as will be explained to form a naturally straight structure induced by the constrained bent sheet member. The frame structure and the sheet member are secured in a manner to disperse unnecessary stresses induced by structural mismatch, structural deflection and thermal expansions, and to allow the use of mirror sheet materials with large thermal expansion coefficients.

The curved reflector structure has a convenient structure for assembling, and a very light mass thus reducing the cost for a precision curved mirror.

The frame structure 14, FIG. 1, comprises a plurality of ribs 16, 18, 20, 22, 24, 26, and 28. The interior edges 32 of all of the ribs are identically shaped (for example, parabolic) forming the desired shape of sheet member 12. Also, ends 34 and 35 of each rib have the same inner surface shape. The outer edges 30 may differ among the ribs.

For example, in one embodiment, rib 16 in FIG. 3 comprises a thin sheet of stamped aluminum alloy or other conventional material such as another metal or a plastic. The spacing of the bottom edge 30 of each of the ribs from the inner edge thereof determines the width of the rib at a given location and therefore the strength of that rib. While it is preferable all of the ribs also have the same shape at edge 30 for ease of manufacture, this is not essential. The ribs are interconnected by a plurality of flexible stringers (elongated sheet metal connector strips) 36, 38, 40, 42, and 44. The stringers may be formed of stamped sheet aluminum or other conventional material such as another metal or plastic.

In FIG. 5, stringer 36 and rib 20 are shown in exploded view. Stringer 36 has a plurality of spaced identical slits 46 which terminate in a relatively wider opening 50 at the base of that slit. A corresponding slit 52 is formed in the ribs in spaced locations for receiving each of the stringers at their respective slits. A stringer 36 slit 46 is inserted in a rib 20 slit 52 and connected therewith as shown in FIG. 6. The slits 52 in the ribs also terminate at their innermost edge in a relatively wider opening 54. The relatively wider openings 50 and 54 in the respective slits 46 and 52 prevent small radii at the inner corners of the slits from interfering with accurately seating the stringers within the slits of the ribs so that the edges 32 of the ribs, when aligned, lie in the same curve.

The ribs interconnected as discussed above form a frame, the parabolic edges 32 of which lie in a cylindrical parabolic surface. The frame is in the form of a structure which is somewhat cellular in nature. The rib structure is relatively thin, flexible in a twisting direction generally about the parabolic focal line, and is easily distortable as discussed above. A twisting moment applied to one end of the frame structure will cause that end of the frame structure to twist with respect to its other end. While the ribs provide stiffness to the structure along the length of the ribs and the stringers stiffness in a direction parallel to the parabolic focal line, this stiffness does not preclude the flexing of the frame structure in response to forces such as might be applied by a bent resilient sheet under stress when attached to the parabolic surface of the rib structure (e.g., stresses which tend to return the sheet to a flat plane configuration). Such internal stresses in the sheet material tend to easily bend and shape the frame structure. That is, each rib can be moved somewhat with respect to the other ribs. The frame structure is flexible to the extent it readily conforms to a desired curve when relatively small forces are applied to it by the sheet member. The stringers 36 and 44 provide rib spacing but relatively little resistance to twisting moments.

The stringers are attached to the ribs for the purpose of spacing the ribs in a parallel array. The stringers also are parallel to each other. The stringers and ribs are sheet metal material whose relatively thin thickness extends parallel to the sheet surface and whose width extends in a direction normal to that surface as shown in FIG. 1. The width of the ribs between edges 32 and 30 is determined by the magnitude of the particular stresses induced by the attached sheet member. The width is sufficient to resist bending in response to such stresses in the plane of the ribs. In other words, the ribs are relatively stiff in a direction parallel to their planes which are normal to the parabolic focal line, and more flexible in a direction normal to their planes.

While the parabolic edge of each of the ribs need not microscopically conform to a given parabolic curve, they should conform to the given curve macroscopically. That is, small deviations in surface condition caused by surface roughness are tolerable as long as the overall surface formed by the parabolic edges 32 of the connected ribs lie generally in a given parabolic curve. Some portions of the rib parabolic edges need not exactly lie in the parabolic curve. In forming a given parabolic surface, sheet member 12 will microscopically conform to the desired parabolic shape when attached to the frame structure.

Preferably the ribs and stringers are secured together with a suitable flexible bonding cement which will maintain the integrity of the structure prior to assembling the sheet member 12 without significantly affecting its distortability characteristic. Bonding of the stringers to the rib structure does not add significantly to the stiffness of the structure.

Because the joint slits 46 and 52 mechanically weaken the corresponding ribs and stringers, cement is provided to strengthen the structure. The cement allows for use of a minimum amount of frame material employed in the ribs and stringers. Preferably, the cement is applied twice, before and after assembling the sheet member 12. Initially, very little cement is applied to the frame structure as a temporary securing of the ribs and stringers. After the sheet member 12 is attached, the curved structure automatically assumes the desired curve shape for the sheet member. The slits at the cross connections are then cemented successively a second time. By way of example, one cement that can be used is a cyanoacrylate adhesive available from the Locktite Corp., catalog number IS-415. This cement has a relatively high viscosity, 1,500 C.P.S., and it cures in several hours at room temperature. The cement, however, is not essential to the structure. By connecting the stringers as shown in FIG. 6, the sheet member tends to maintain the stringers in the interconnected position.

The end ribs 16 and 28, FIG. 1, preferably are thicker than the intermediate ribs 18-26 in a direction normal to their plane to stiffen them. These ribs may be used to interconnect similar parabolic structures thereto to form an elongated, cascaded structure.

Apertures 58 are formed in the end ribs 16 and 28 for purposes of attaching adjacent frame structures in parabolic alignment to form a continuous parabolic trough. Also, the apertures may be employed in the intermediate ribs for electrical wiring, heat conducting tubes, fluid conductor tubes, or other accessories to the structure.

In FIG. 3, rib ends 34, 35 are mirror images of each other and therefore only one will be described. The rib structure at these ends is shown in more detail in FIG. 4 wherein end 35 of rib 16 is shown. A recess 62 is formed in the parabolic edge 32. End 35 includes an upstanding wall 60. The upstanding wall 60 serves as the restraining member for the stressed sheet member 12. All of the ribs are constructed similarly. The remaining parts shown in FIG. 3 are discussed shortly.

Sheet member 12, FIG. 4, comprises a thin bendable mirror sheet 64, in one embodiment formed of glass (having a front and a rear surface), on the underside (i.e. the rear surface) of which is deposited a highly reflecting coating 66 (shown thicker than is actually the case) forming a second surface mirror. The coating 66 may be silver or aluminum whose thickness is sufficient for reflecting visible radiation, e.g. 100~500 nm. By second surface mirror is meant that incident radiation 68 passes through the sheet 64 before incidence on the reflecting coating 66, and is reflected back through the sheet 64 into the ambient. The coating 66 provides a highly specular surface, i.e., reflectivity of greater than 85%. The sheet of glass may have a thickness of 0.18 mm in one embodiment but may generally lie in the range of up to about 0.23 mm. A silver coating 66 on glass provides an average reflectivity of approximately 92% for visible light.

One edge of the sheet 12 is secured to an edge rim structure 70 and a like rim structure is secured to the opposite edge. Only one rim structure 70 is described as the other is identical.

The rim structure 70 comprises a U-shaped channel member 72 in which is inserted an L-shaped rubber gasket 74. Edge 76 of sheet member 12 abuts leg 78 of the gasket 74. Leg 78 cushions the mirror sheet member 12. In the presence of thermal cycling, leg 78 exhibits a large dynamic range of elastic deformation and absorbs differences in linear expansion between sheet member 12 and rib 16. The leg 78 applies a retaining force on the sheet member even if the thermal expansion difference is large. The rim and frame structure thus allow the use of a metal frame with an organic sheet member having a thermal expansion significantly different than that of the frame structure. Gasket 74 cushions the sheet member 12 from the stresses introduced by leg 82 of the channel member 72. The legs of the channel member compress the leg 80 of rubber gasket 74 against the sheet 64 to retain it within the rim structure 70. Upstanding wall 60 is notched at 84 and wall 60 end 86 is bent as shown to retain the channel member 72 within the recess 62. Edge 88 of channel member 72 is tapered as shown to lock it within a complementary tapered groove in recess 62 to further retain the channel member 72 therein. The structure of recess 62 and channel member 72 is unique and forms a simple lock between rib 16 and channel member 72.

In the curved structure, each element abuts other elements and constrains their mutual positions without using screws or other fasteners. When the various elements including the sheet member are assembled, the curved structure automatically forms a mechanically stable structure thus establishing a monocoque structure with excellent structure strength.

As is well known, glass plates, particularly relatively thick ones, cannot be deformed when cold to any great extent. A process is disclosed herein for the enhancing the bendability of thin bendable glass which can be formed into a curve such as a parabola or other cylindrical shape for use with the frame structure. Typical parabolic mirrors are represented by rim angles $\theta_r$ of about 90° to 120° (angle between parabola axis and the line which passes through the parabola focal point and the edges of parabola). The former mirror has a minimal reflection pass, and the latter an average mininal pass. The corresponding depth of the curved mirror surface becomes very large, exceeding 25% and 43% of the aperture, respectively. To fabricate such parabola mirrors by bending mirror plate, large deformation is necessary in the mirror plate material. Deep bending of thick glass plates leads to breakdown. In accordance with one aspect of the present invention, a heat treated thin glass plate, for example, made of thin boron-silicate glass preferably up to about 0.23 mm thick, can be bent through a large angle. The term "heat-treated" as employed herein means heating a material to improve its characteristics or quality by the introduction of desirable thermal phenomena that occur at elevated temperatures. Implicit also is eventual cooling of the material subsequent to the heating. In one embodiment the maximum deformation depth of a 0.18 mm thick sheet glass exceeded more than 45% of the aperture width without breakdown.

To enhance the bendability of thin glass sheets, glass quality is carefully selected and the glass then heat treated as discussed below. Thin glass sheets employed with the frame structure 14 should satisfy certain conditions including geometrical factors, glass quality, and proper handling, since such glass sheets are required to remain in the curved condition under stress.

Geometrical factors include forming the glass sheet with parallel plane surfaces, a given thickness, and a mirror smooth surface. An irregular thickness appears as a wavy distortion of the glass sheet. Such glasses are difficult to bend homogeneously, and are brittle due to undesirable stress concentrations during bending. Proper thickness is an important factor for bending sheet glass. To determine the proper thickness, knowledge of elastic behavior of glass sheets is necessary. This is explained later. Surface defects and scratches seriously weaken glass elasticity. Selection of glass sheets which satisfy the above factors is important. High level, pristine, float glasses satisfy the above conditions.

Glass quality involves inclusions, homogeneity of composition, and cords (reams). Inclusions, such as gas bubbles, stones, and knots (irregular glassy inclusions) are serious faults. Bending stresses have a tendency to concentrate at the inclusions at which cracks easily start. These inclusions are randomly localized. Corresponding strains are difficult to remove by heat treatment. Accordingly, selection of glass free of such inclusions is necessary.

Homogeneity of composition relates to uniformity of elastic properties, and to other subtleties of a more complicated nature which relate to the bendability of glass sheets and their shaping. Some cords belong to compositional inhomogeneities, and are surface or bulk irregularities induced by non-uniform conditions during solidification of the melt glass. Cords induce unevenness or ridges on the surface, and become a source of sheet distortions. Cords have different optical parameters compared to normal regions. It is believed that bending stresses concentrate at the boundary between a cord and a normal region. Cords are sensitively observed by mirror images on glass sheets (including second surface mirrors). In this technique, glass sheets are slightly concaved and stress is thereby applied. Reflections of straight lines (for example, graph paper) are observed. If cords exist, the lines are distorted. Patterns of the reflected images are disturbed by cords, and such disturbances show a large scale, directional, and periodic nature compared to other sources (inclusions) which show local, random distributions. Cords are the major factor for breakdown of thin glass sheets. Related strains are also detected using photoelastic effects.

Therefore, the thin glasses employed are those which do not have serious cords. Small slight cords are easily removable by heat treating. Glass sheets with non-observable cords are safely bendable to the desired extent when they satisfy the other conditions mentioned above. These selected sheets are heat treated as follows. A thin glass sheet, for example, boron-silicate glass 0.18 mm thick (Matsunami #0100), is washed in a conventional organic solution. The solution, by way of example, may include acetone and ethyl-ether. These remove waxes, fats, oils, gums, resins, plastics, lacquers, and varnishes from the glass. Other organic solutions for cleaning the glass may alternately be employed. Aqueous solutions are not used as they promote surface defects and weaken the glass.

After cleaning, the glass is heat treated by placing the glass horizontally on a flat support, such as a flat quartz plate. The glass is then heated for one hour at 550° C. in a nichrome furnace, one with nichrome heating wires, although other furnaces may be alternatively employed. This temperature is slightly above the glass annealing point (543° C.). The glass is then cooled at a constant rate of 250° C. in a twelve hour period. Thereafter, it is cooled in the ambient to room temperature.

Detailed behavior of glass plates with respect to their elasticity is not available, nor is there convenient theory available to explain large deformations of glass plates. Therefore, some work was performed to determine the mechanical behavior of glass plates. In performing such work, the tangent modulus of elasticity $E_t$ (kg/mm$^2$) for small deformations becomes a reference for the bending performance. Measured results of $E_t$ for soda glass, boron-silicate glass heat treated as described above, aluminum alloy (JIS-A5052P), and cast methyl-methacrylate plates are shown in Table I, where published data for the tensile strength $\sigma_{ts}$ and specific gravity $\rho$ are also given.

As shown in the table, boron-silicate glass plate has a value of tangent modulus of elasticity close to that of the aluminum alloy. Examination of Table I shows that glass plates of the type described above can be bent similarly to aluminum alloy plates if sharp corner deformations are not required.

To select suitable materials for deep bending performance, it is useful to consider first the material parameters and to neglect geometrical factors. The glasses have a lower specific gravity $\rho$ than aluminum, and have an exceptionally high value of $\sigma_{ts}$ compared to the other materials. When a rectangular plate with thickness t is elastically bent into a radius of curvature r, the surface is stressed to a value $\sigma_s$. The normalized radius of curvature r/t is described by $$r/t \propto E_t/\sigma_s \gtrsim E_t/\sigma_{ts}.$$

A material with a small value of $E_t/\sigma_{ts}$ can be bent into a more curved form. The result in Table I indicates that boron-silicate glass is bendable into relatively small radians, and is indeed superior in this respect to the aluminum alloy.

When a long elastic rectangular sheet is bent into a trough shape, its structure is automatically stiffened along the longitudinal axis. This behavior is emphasized for materials with a larger value of $E_t$. The gravity sag of an end-supported trough is proportional to $\rho/E_t$ and is thus relatively small for light materials having a large tangent modulus of elasticity. The sag must be minimized for a trough mirror structure to have rigidity appropriate for high optical performance. The values of $\rho/E_t$ in Table I again show that glasses are superior materials.

In one embodiment a cylindrical parabola mirror having an aperture of 26 cm×30 cm and a focal length of 6 cm and a total weight of 110 grams was constructed. A boron-silicate glass sheet 30 cm×30 cm×0.018 cm was bent using a thin aluminum metal frame, FIG. 4. To bend the glass, forces were applied to the glass edges. In one of the embodiments of the invention, the forces were tilted a few degrees from the parallel plane of the mirror so that small inwardly directed bending moments m are induced at the edges. In bending and shaping the glass sheet into a parabolic curve, m effectively reduces the maximal forces by about a half compared to the case where the forces are applied parallel to the mirror plane. This enables the glass sheet to be shaped safely with moderately low force. Excessive bending stress is thus avoided. The corresponding minimal radius of curvature of the parabolic mirror is about 60 mm. Before bending, the glass was vacuum evaporated with aluminum on an exterior surface at a substrate temperature of 100°~200° C. to form the reflective coating 66. Silver coating can also be used to provide a high reflection mirror surface. To protect the mirror, the aluminum layer is coated with an acrylic lacquer 67, FIG. 4, which is highly resistant to weathering, scratching, and mechanical abrasion. In the case of a silver reflective layer, it is overcoated with copper and then with lead oxide.

In the bent state, the glass sheet 64, FIG. 4, exhibits internal compressive and tensile stresses which tend to return the sheet 64 to the flat unbent state. These internal stresses include compressive stresses on the concave side of the neutral surface, i.e., the internal glass surface in which the glass material does not undergo strain during bending, and tensile stresses on the convex side of the neutral surface. The neutral surface lies approximately midsection the glass sheet 64 between the front surface facing the radiation 68, FIG. 4, and the glass sheet rear surface on which coating 66 is deposited. What this means is that the glass material between the neutral surface and the rear convex surface tends to elongate in tension and the glass material between the neutral surface and the front concave surface tends to contract in compression.

The deposited coating 66, which is generally hbout 10% the thickness of the glass sheet, has a negligible effect on supporting the tensile load in the glass sheet 64 when bent. The protective coating deposited over the coating 66 also contributes negligible support to the tensile load on the glass so that there is negligible reduction of the internal tensile stresses in the glass sheet when bent. Therefore, the magnitude of the internal stresses in the glass remains substantially unchanged with or without the coating 66.

The end ribs had a thickness of 1 mm and the remaining ribs and stringers were 0.5 mm in thickness. The ribs were formed by die forging. The parabola reference curvature frames were fabricated with a numerical controlled wire-spark machine with a maximum deviation from the intended parabolic curvature of ±10 micrometers. Focused beamwidth for such a structure was measured to be about 1 mm employing a laser beam.

By employing the glass sheet 64 as a bent mirror, the internal stresses of the glass add considerably to the strength of the combined structure. The specific gravity $\rho$ of glass is relatively small as compared to aluminum as shown in Table I. The tensile strength $\sigma_{ts}$ of glass is extremely high compared to other materials. The specific gravity divided by tensile strength, a useful factor of merit, is thus exceptionally high compared to other materials which might be used for lightweight, inexpensive, parabolic mirrors. Thus, from a mechanical strength point of view, the thinnest and lightest mirrors can be obtained from bendable glass sheets. The glass thickness may be scaled according to the glass area. That is, relatively small plate areas employ thinner glasses than glasses with larger plate areas. It should be understood that the glass should be sufficiently thick so as to exhibit internal stresses tending to return the glass to the plane state. Bendable glass plates have an elastic behavior which is very homogeneous, and can maintain a very precise bending curvature over a large area. Cost of glass per unit weight is also less than for aluminum alloy. In addition to the above, glass is readily made with an extremely smooth surface, one that is much more suitable for a mirror than that of any other conventional materials. A second surface glass mirror, is far more resistant to corrosion, mirror surface deterioration, and weathering than any other metal mirror such as aluminum, or organic material such as methyl-methacrylate and polycarbonate.

The resultant combined monocoque structure of the glass bent sheet with the lightweight aluminum frame structure provides a combination of flexible and brittle elements. The combination is unavoidable because a material with a low strength modulus is very flexible, soft, weak, and nonbrittle. A very high modulus gives a material that is not very flexible, is strong, and tends to be brittle. The best material has an intermediate modulus that results in flexibility, strength, and some unavoidable brittleness. One possible way to have an optimized, tough structure is to combine a plurality of materials in a form of composite. Brittle glass and a rather flexible aluminum alloy structure is very light in mass, is well distributed and has a strength that resists structural deflections.

Prior art systems employ bent glass which is set into a permanent set. A permanent set is to be avoided because this will remove internal stress in the structure resulting in loss of the desired fit of the mirror sheet to the parabolic reference surface formed by the ribs. An uncemented frame structure would tend to loosen upon removal of the internal stresses. The residual internal stresses thus are highly advantageous in maintaining structural integrity. Thus, it is this structural integrity which forms a monocoque structure in which the frame and glass plate are so loosely secured that stresses due to structural mismatch, structural deflection, and thermal expansion are well dispersed.

Glass is perhaps the ideal material mechanically to employ as a reflector because of its high strength per unit weight. One does not ordinarily think of glass as being bendable. However, when it is very thin, as described above, uniform in thickness, preferably annealed as described above, and subject to uniform stress, it can be formed into the structure as described. The glass optical properties are virtually ideal, being highly transparent at least 92% or better. Its surfaces are very flat, provide almost pure specular reflection, with little or no diffused reflection component. The thinness of the glass reduces light absorption to a minimum. As a result, reflectivity exceeds 93% in the combined structure.

This compares with about 80% for an acrylic mirror. In addition to this, the glass surface is relatively resistant to scratches or deterioration in harsh environments.

Alternative structures may employ other transparent sheet material for a second surface mirror as a substitution for the glass sheet described. One alternative material is an organic material such as methyl-methacrylate, polycarbonate, Mylar, etc., coated with a reflecting medium. Methyl-methacrylate is one of the most transparent of the plastic materials and has relatively high strength characteristics. These characteristics are shown in more particular in Table I above. While methyl-methacrylate may not be as energy efficient as glass due to its inferior optical properties, its resistance to shattering and breakage and its ease of manufacture may be desirable in some implementations.

In employing a methyl-methacrylate mirror plate, the methyl-methacrylate plate preferably has a thickness of 0.5–2.0 mm. One side of the plate has a mirror-smooth surface. Such a mirror-smooth surface is obtained by forming the sheet by casting the methyl-methacrylate. The other side of the sheet may not necessarily be mirror-smooth but its light scattering tendency can be minimized. The transparency of such a cast sheet is about 92%.

Large scale cylindrical mirrors, for example, 1.5 square meters in aperture area, are easily processed with the above-described steps. Using these steps, solar radiation collectors with a concentration of 5–50 is estimated to have relatively low cost per square meter of aperture.

Figure 7:
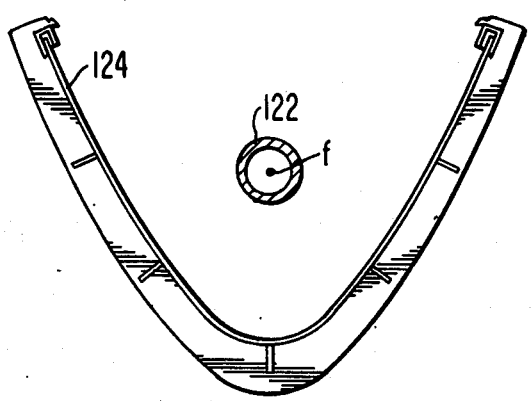
FIG. 7 is an end elevation view of the structure of FIG. 1 employed in a solar collecting system.

By way of example, one implementation of the structure is illustrated in FIG. 7 showing a solar collector for thermal conversion. The reflector structure as described above in connection with FIG. 1, has a parabolic surface 124 having a focal line f. A fluid collecting tube 122 is mounted at the focal line f. The collector tube 122 may use any suitable collecting fluid as known in this art. Suitable storage apparatus (not shown) is connected to the tube 122 for the storing of the heated fluid. Such heated fluid may be water or other liquids, or gases. A suitable tracking mechanism for orienting the structure 10 to continually face the sun may also be employed, but is not illustrated.

What is claimed is:

1. A curved reflector structure comprising:
   a distortable frame structure comprising a plurality of elements forming a given trough curve having first and second trough edges, each element being movable with respect to any other element on the structure, and
   a stress inducing and stress absorbing bent, normally flat resilient skin member consisting of a glass sheet having a front and a rear surface, and a reflective coating secured to the rear surface, said glass being homogeneous and being a thickness between 0.18 and 0.23 millimeters, said reflective coating being of a thickness between 100 and 500 nanometers said skin member being secured to said frame structure at said edges and coupled to said given curve which together form a curved monocoque unit, said skin member tending to align said elements and to restrain the relative movement of said elements and the resulting distortion of said frame structure.

2. The reflector structure elements of claim 1 wherein said sheet member in the absence of said coating is transparent and said coating is formed on the surface of said skin member facing the frame structure.

3. The reflector structure of claim 1 wherein said frame structure comprises a plurality of parallel rib members each intersecting a plurality of parallel stringer members, said rib members each having an edge surface lying in said given curve, and retainer means secured to said frame structure at said edges for retaining said sheet member under stress in contact with at least said rib members at said curved edge surfaces.

4. The reflector structure of claim 1 wherein said coating is a film of reflecting metal covered with an epoxy resin coating.

5. The reflector structure of claim 1 wherein said frame structure forms a parabolic cylindrical surface to which said skin member abuts.

6. The reflector structure of claim 1 wherein said frame structure forms a parabolic cylindrical surface to which said skin member abuts, the reflector further including heat collecting means secured at the focal line of said parabolic surface.

7. A curved reflector structure comprising:
   a plurality of spaced parallel ribs each having an edge thereof lying in the same curve,
   a plurality of spaced parallel members normal to and secured to said ribs so as to form a distortable frame stucture with said ribs, each member being secured so it can move relative to the other members,
   a reflecting, resilient, stress-absorbing and stress-inducing member consisting of a substantially glass sheet member having a front and rear surface and being a thickness between 0.18 and 0.23 mm, and a reflective coating being secured to said rear surface being a thickness between 100 and 500 nanometers, said reflecting, resilient stress absorbing and stress inducing member having a first unstressed normal state, said glass sheet member being stressed when bent to abut said ribs at said curve in a second state, said stress tending to return said glass sheet member to said first normal state, said glass sheet member having first and second edges having a first spaced relationship in said first state and a second spaced relationship in said second state, and
   means for securing said glass sheet member edges to said frame structure in said second spaced relationship so that said glass sheet member abuts said rib edges at said curve whereby said stress is transferred to said frame structure forming a monocoque curved reflector therewith to thereby align said members to said glass sheet member.

8. The reflector structure of claim 7 wherein the ribs are each formed of sheet material, the outermost rib at each end having a thickness greater than the thickness of the remaining intermediate ribs.

9. The reflector structure of claim 8 wherein at least the outermost ribs each have at least one aperture.

10. A method of forming a curved glass structure comprising:
    forcing opposite edges of a reflector at room temperature in a direction towards one another to bend the reflector, said reflector consisting of plane glass sheet having a front and rear surface and being a thickness between 0.18 and 0.23 mm, and a reflective coating being a thickness between 100 and 500 nanometers,
    strengthening said edges prior to said forcing, and
    retaining the bent reflector in the bent state at said edges.

11. The method of claim 10 wherein said forcing step includes abutting said reflector against a given curved surface during said retaining.

12. An article of manufacture comprising:
a monocoque parabolic cylindrical reflector including a distortable frame structure comprising a plurality of curved elements which tend to move relative to one another,
said reflector consisting of a transparent substantially glass sheet having a front and a rear surface and being a thickness between 0.18 and 0.23 mm, and a reflective coating being secured to said rear surface and having a thickness between 100 and 500 nanometers, said glass sheet being under stress attached to said frame structure and a film of highly specularly reflecting material on said sheet forming a second surface mirror therewith, said glass tending to align the curves of said elements to the curve of said glass.

13. An article of manufacture comprising:
a bent reflector consisting of a sheet of glass having a front and a rear surface and being a thickness between 0.18 and 0.23 mm and a reflective coating secured to said rear surface of the sheet of glass and being a thickness between 100 and 500 nanometers, internal stresses tending to flatten said sheet of glass, and
frame means for retaining said sheet at its edges in the bent state, wherein the depth of the bend is greater than 5% the width dimension across the bend.

14. The article of claim 13 wherein first and second edges of said sheet of glass have corresponding rim members attached thereto, said means for retaining said sheet of glass including first and second recesses for respectively receiving and securing a different one of said rim members.

15. An article of manufacture comprising:
a bent sheet of glass having substantially negligible cords and inclusions and internal compressive and tensile stresses tending to flatten said sheet, the neutral surface of said bent sheet being about midway between the front and rear surfaces of the sheet;
a reflective coating deposited on a surface of said sheet, said coating having negligible support for said tensile stresses; and
means for retaining said sheet at its edges in the bent state, wherein the depth of the bend is greater than 5% the width dimension across the bend.

16. The article of claim 15 wherein first and second edges of said sheet of glass have corresponding rim members attached thereto, said means for retaining said sheet including first and second recesses extending in a direction nornal to the plane of said sheet in an area next adjacent thereto for respectively receiving and securing a different one of said rim members.

17. A curved reflector structure comprising:
a distortable frame structure comprising a plurality of elements forming a given trough curve having first and second spaced longitudinal edges parallel to the trough, each element being movable with respect to any other element on the structure, said elements including sheet retaining means at said edges; and
a stress inducing and stress absorbing normally flat bent resilient glass sheet located between and abutting said retaining means at the sheet edges for retaining the sheet in the bent state and a reflective deposited coating on one surface of the sheet, said glass sheet when bent having substantially negligible cords and inclusions and internal compressive and tensile stresses of a magnitude tending to return the sheet to the flat state, said sheet having a neutral surface about midway between the sheet's front and rear surfaces, said sheet abutting said frame structure at said given curve, said stresses tending to restrain the movement of said elements and the resulting distortion of said frame structure to thereby form a curved monocoque unit, said coating comprising material tending to support negligible tensile load such that substantially all said tensile stress is borne by said sheet.

18. The reflector structure of claim 17 wherein said glass sheet has a thickness sufficiently thin to bend at room temperature.

19. A curved reflector structure comprising:
a plurality of spaced parallel ribs each having an edge thereof lying in the same curve, opposite ends of each rib including a projecting restraining member portion, the portions at one end lying in one row and the portions at the other end lying in a second row spaced from the first row;
a plurality of spaced parallel stringer members normal to and secured to said ribs so as to form a distortable frame structure with said ribs; and
a reflecting resilient, stress-absorbing and stress-inducing glass sheet having a deposited reflective coating, said sheet having substantially negligible cords and inclusions, said sheet having a first substantially unstressed normal state, said sheet being stressed in a bent second state, said stress including internal compression and tensile stresses of a magnitude sufficient to return said sheet to said first normal state, said bent sheet having a neutral surface about midway between the sheet's front and rear surfaces, said sheet having first and second edges abutting respective ones of sid portions in said first and second rows and said ribs at said curve whereby said stresses are transferred to said frame structure at said sheet edges for stiffening said frame structure.

* * * * *